May 26, 1931.  E. C. TILLY ET AL  1,806,654

TICKET ISSUING MACHINE

Filed April 5, 1928  9 Sheets-Sheet 2

| Serial Number | |
|---|---|
| Nº | M/C |
| FARE | PENCE |
| DATE | LETTER |
| STAGE | Nº |
| CLASS | NAME |

FIG. 3.

| BADGE Nº | NAME | CARD INDEX Nº | | |
|---|---|---|---|---|
| CAR | DATE | CASH REC'D £ | | |
| ROUTE | TERMINATION | SHORT | | |
| DUTY | COMMENCEMENT | OVER | | |
| JOURNEY | | | | |
| 1ᴰ 2ᴰ 3ᴰ | Authority | 4ᴰ 5ᴰ 6ᴰ | | |
| | | | | |
| | EXTENDED CASH | | CASH £ | |

FIG. 4.

| 345616 | |
|---|---|
| Serial Number | |
| Nº 829B M/C | |
| FARE 2 | PENCE |
| DATE R | LETTER |
| STAGE 11 | Nº |
| CLASS ORD.Y | NAME |

FIG. 5.

| BADGE Nº 24 | NAME J. Smith | CARD INDEX Nº C368 | | |
|---|---|---|---|---|
| CAR 1625 | DATE Jan 1st 1928 | CASH RECD £3 3 4 | | |
| ROUTE 46 | TERMINATION | SHORT = = | | |
| DUTY 1st | COMMENCEMENT | OVER = = | | |
| JOURNEY 14 | | | | |
| 1ᴰ 2ᴰ 3ᴰ | Authority A. Clarke | 4ᴰ 5ᴰ 6ᴰ | | |
| 024 036 054 | 345616 | 145 268 024 | | |
| 000 012 014 | 345412 | 121 188 012 | | |
| 24 24 40 | 204 | 24 80 12 | | |
| 2 0 / 4 0 / 10 0 / 14 / 8 0 | 829 B 829 B | CASH £ 3 3 4 | | |
| 3 3 4 | EXTENDED CASH | | | |

FIG. 6.

INVENTORS

E. C. Tilly & H. Mattinson

By Watson, Coit, Morse & Grindle

ATTys.

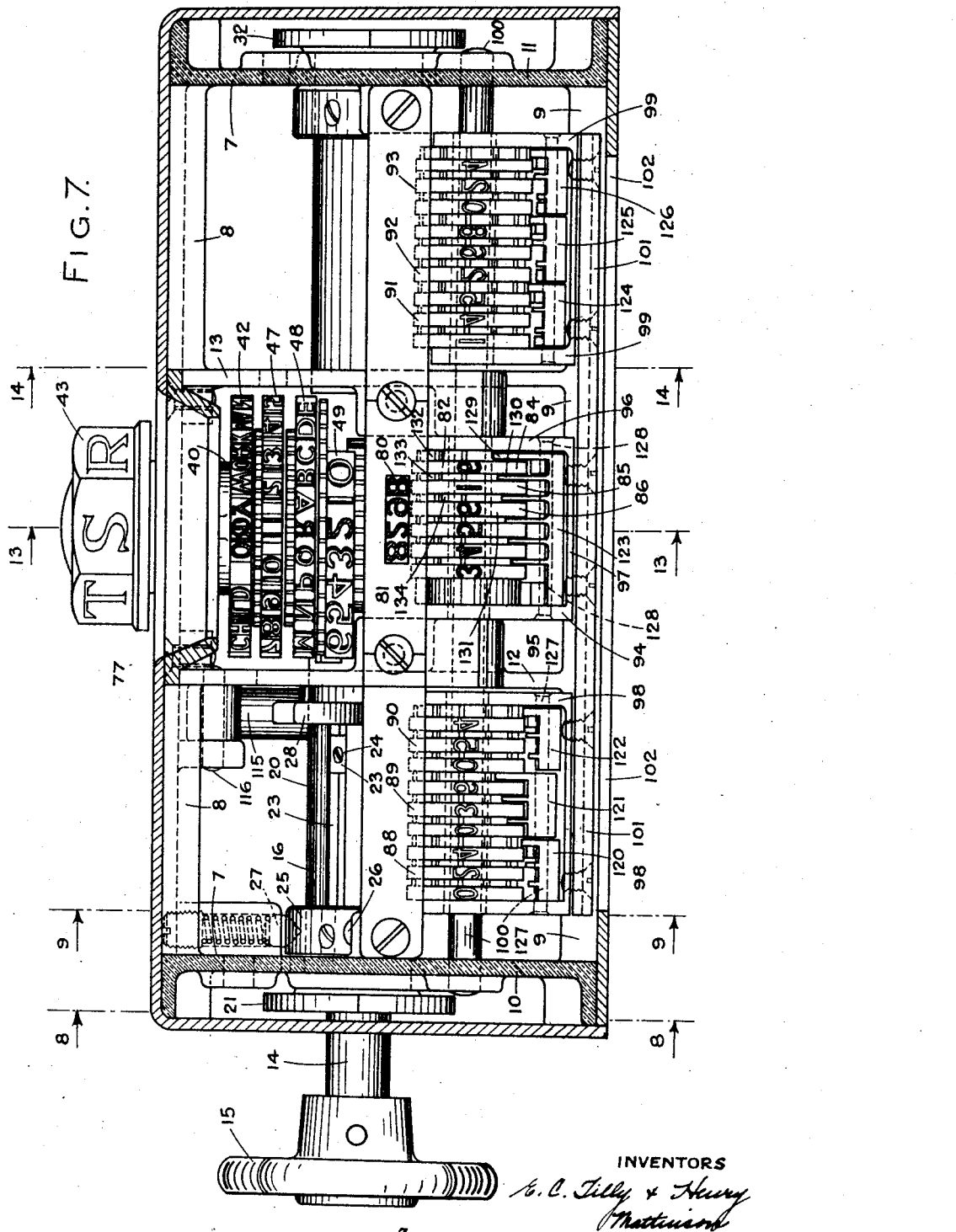

May 26, 1931.　　　E. C. TILLY ET AL　　　1,806,654
TICKET ISSUING MACHINE
Filed April 5, 1928　　　9 Sheets-Sheet 4

INVENTORS
E. C. Tilly & A. Mattinson
By Watson, Coit, Morse & Grindle
ATTys

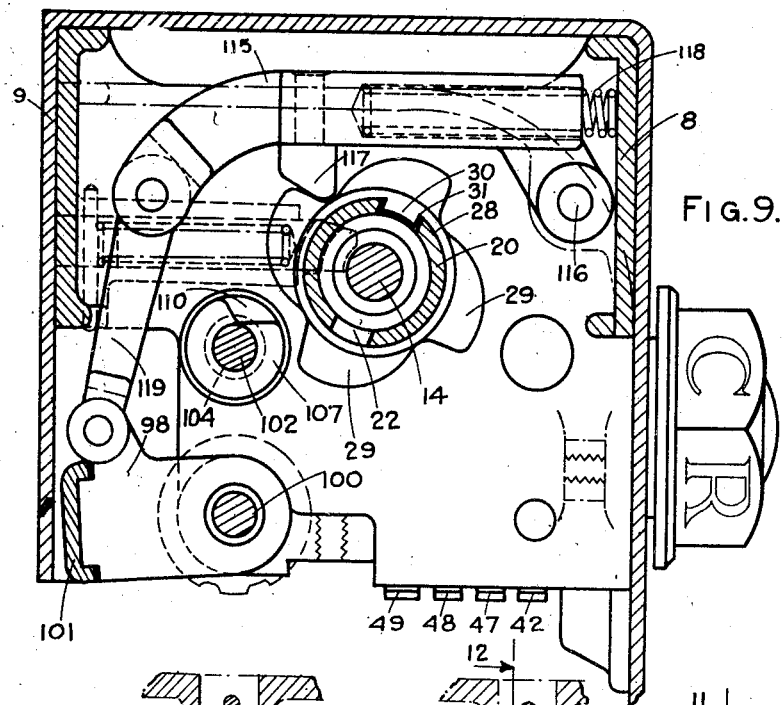
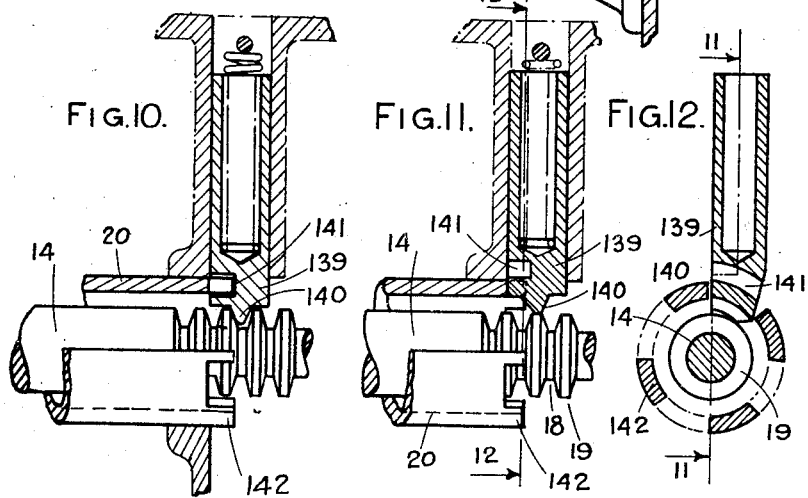

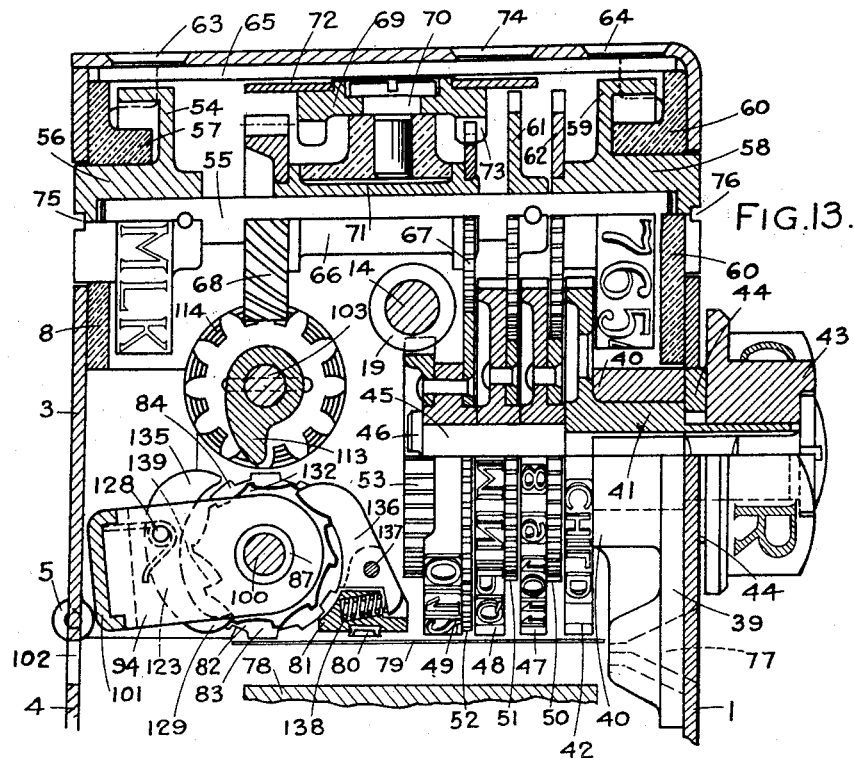
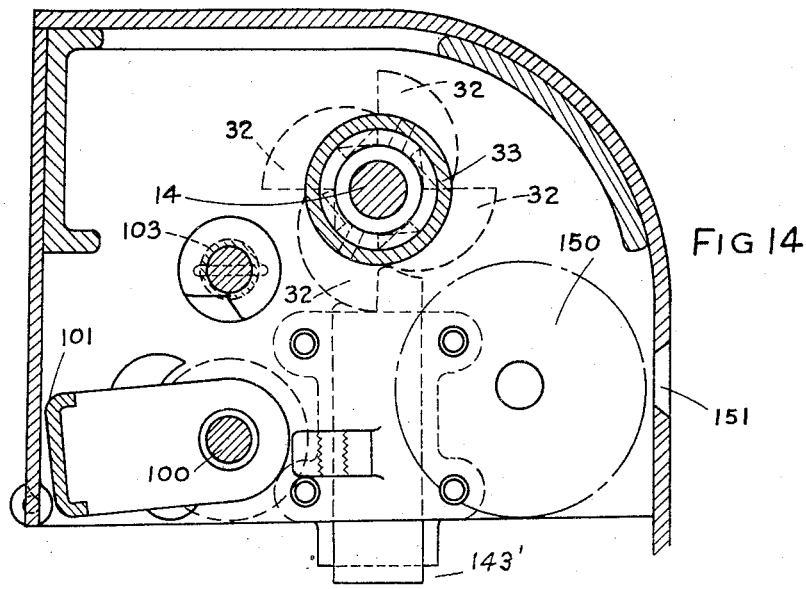

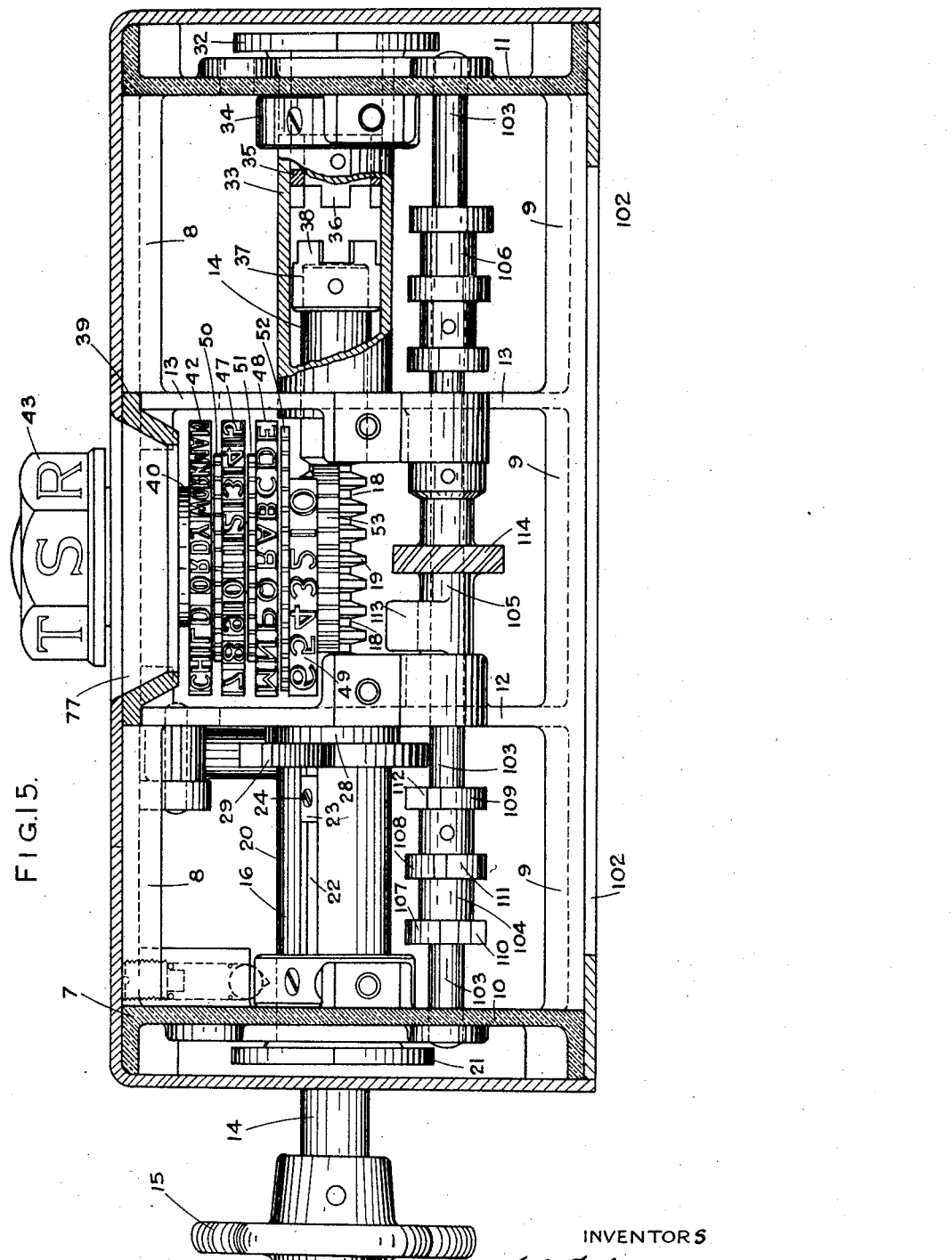

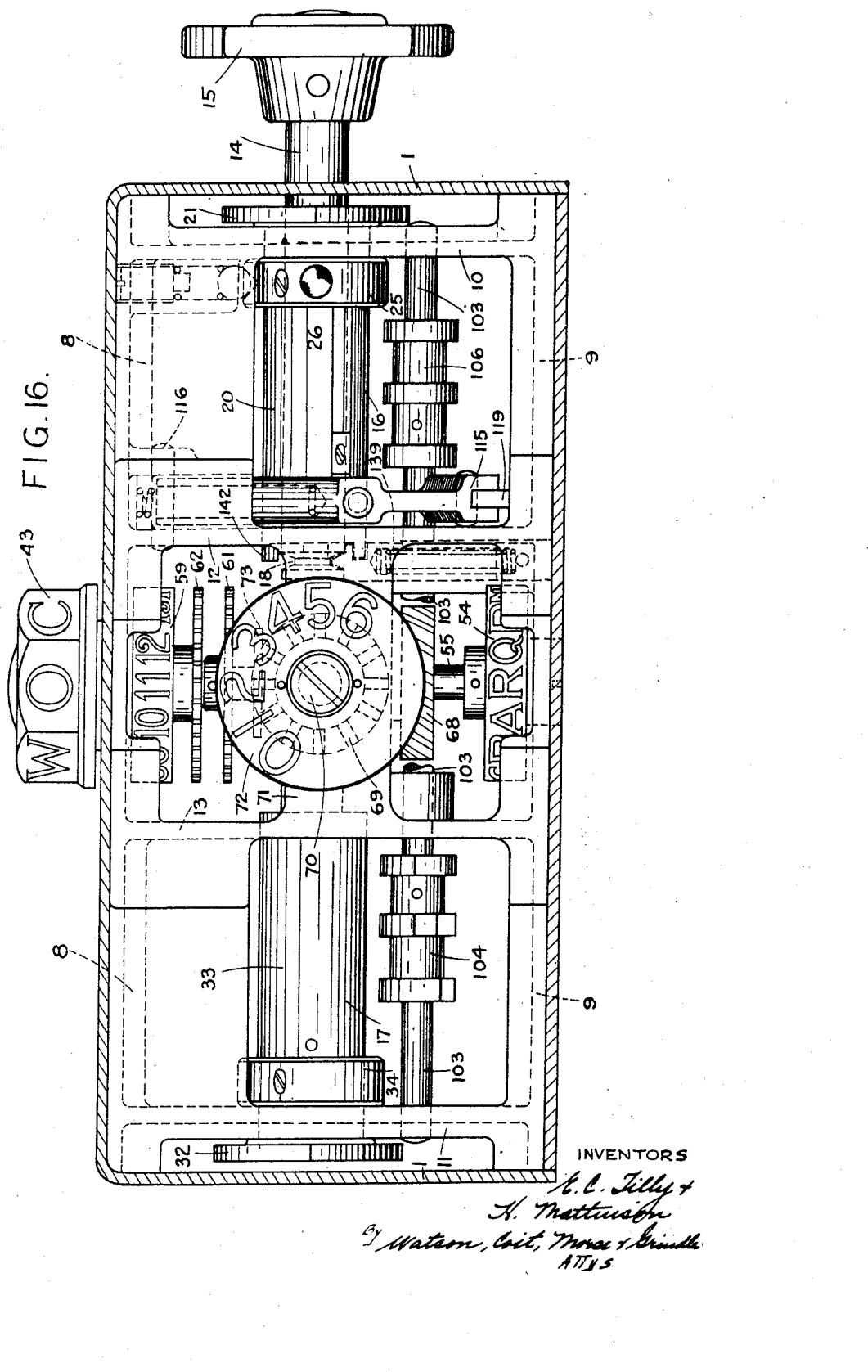

May 26, 1931.  E. C. TILLY ET AL  1,806,654
TICKET ISSUING MACHINE
Filed April 5, 1928  9 Sheets-Sheet 9

INVENTORS
E. C. Tilly + H. Mattinson
By Watson, Coit, Morse & Grindle
ATT'ys

Patented May 26, 1931

1,806,654

UNITED STATES PATENT OFFICE

ERNEST CLAYTON TILLY, OF MONTPELIER, BRISTOL, AND HENRY MATTINSON, OF DISLEY, ENGLAND

TICKET ISSUING MACHINE

Application filed April 5, 1928, Serial No. 267,704, and in Great Britain April 25, 1927.

This invention relates to ticket issuing machines of the type in which the machine marks the tickets with an indication of value, together with other essential data (such as machine number ticket serial number, stage number date, classification, etc.) and also provides a record or check on the number and value of the tickets issued.

The object of this invention is to provide an improved form of such machine.

The present invention consists in a ticket issuing machine comprising a plurality of separate counting units corresponding to different values of tickets to be issued, setting means acting to bring marking elements into position for correctly marking the ticket, and operating means for effecting the actual marking of the ticket, the setting means also acting to connect the desired counting unit with the operating means whereby tickets of different values will be counted separately.

Preferably both the setting and the actual marking of the tickets are effected through the movement of a single handle, that is so mounted as to be movable both longitudinally and angularly.

One constructional form of the improved ticket issuing machine is illustrated in the accompanying drawings in whch:—

Fig. 3 shows a ticket blank.

Fig. 4 shows a record card blank.

Fig. 5 shows a printed ticket corresponding to Fig. 3.

Fig. 6 shows a printed record card corresponding to Fig. 4.

Fig. 7 is an enlarged section viewed from below taken on the horizontal plane indicated by 7—7 in Fig. 2, but with the plates for the holding straps omitted.

Fig. 9 is a sectional elevation taken on the line 9—9 of Fig. 7.

Figs. 10, 11 and 12 are sectional views of a detail showing means for securing the operating shaft and its handle against rotating except when it is accurately set longitudinally.

Fig. 10 shows the parts in a position in which the operating shaft is accurately set longitudinally and is free to rotate.

Fig. 11 corresponds to Fig. 10, but shows the parts in a position in which the operating shaft is not free to rotate, this figure being a section on the broken line 11—11 of Fig. 12.

Fig. 12 is a section taken on the line 12—12 of Fig. 11.

Fig. 13 is a sectional elevation on the line 13—13 of Fig. 7.

Fig. 14 is a sectional elevation on the line 14—14 of Fig. 7.

Fig. 15 is a sectional view from below corresponding to Fig. 7, but with the counting units removed to show the selector shaft underneath.

Figure 1:
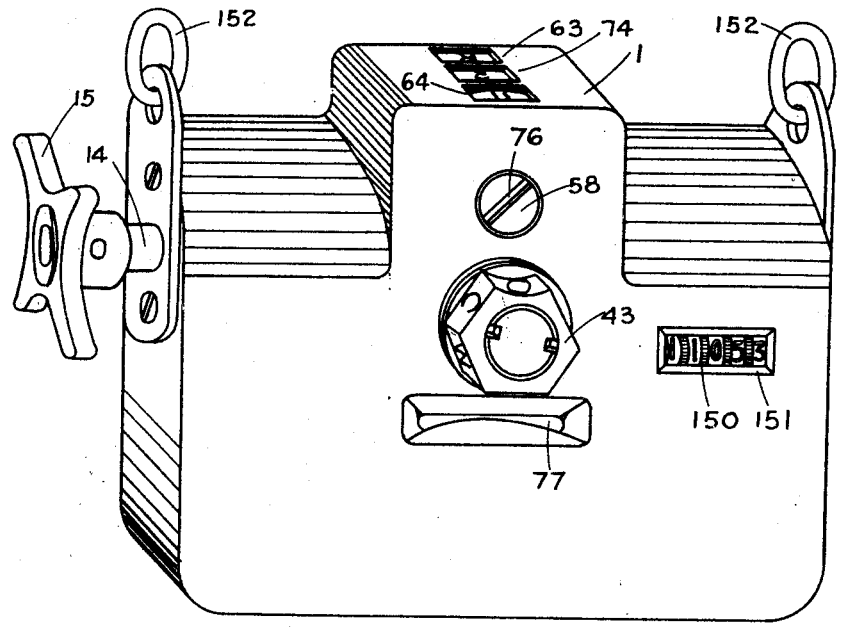
Fig. 1 is a perspective view of the machine from the front.
Figure 2:
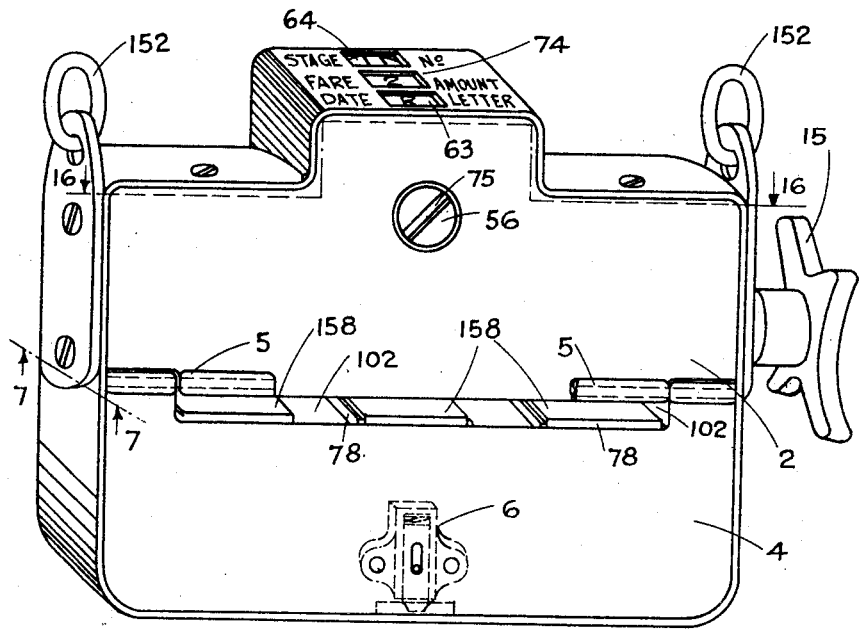
Fig. 2 is a perspective view from the rear.

Fig. 16 is a sectional plan on the broken line 16—16 of Fig. 2.

Figure 17:
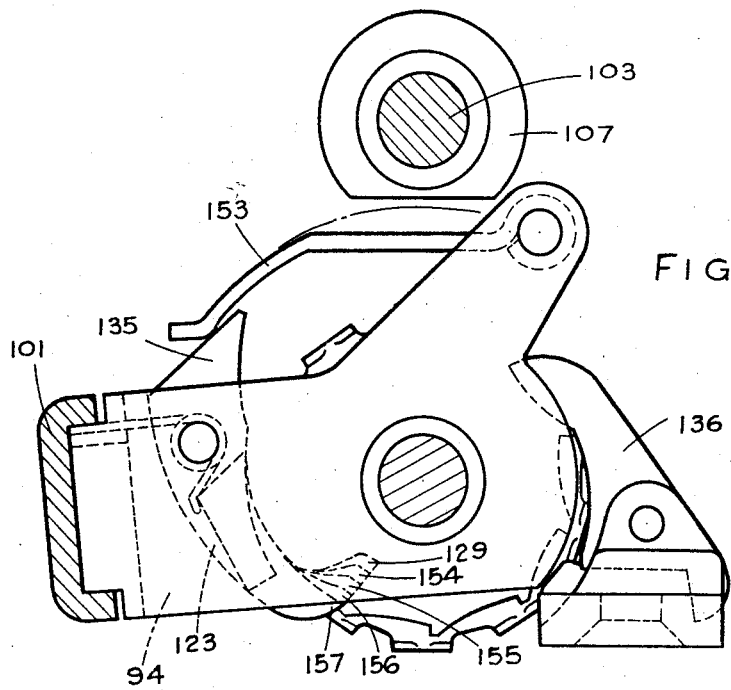

Fig. 17 is a section on a larger scale than the preceding figures indicating a modified form of counting unit.

Figure 18:
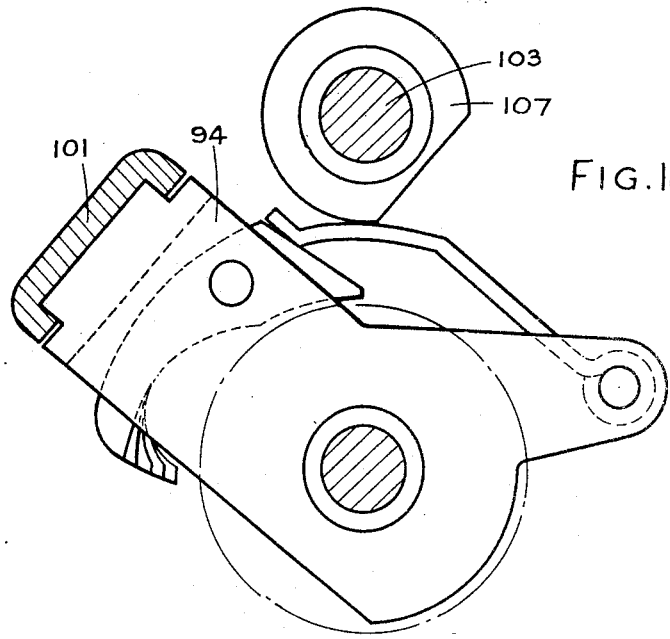

Fig. 18 corresponds to Fig. 17 but shows the parts in a different position.

Referring to Figs. 1 to 16, the improved machine comprises an outer casing 1 with a detachable rear side 2 which when removed provides an opening through which the mechanism may be inserted. In Fig. 2, this rear side of the casing is shown as consisting of an upper portion 3 to which a lower portion 4 is connected by hinges 5, said lower portion 4 being secured in its closed position by a locking device 6 of known construction.

The mechanism is mounted in a frame 7 comprising front and rear members 8 and 9 respectively, such members being connected by end walls 10 and 11 with intermediate partitions 12 and 13 as most clearly shown in Fig. 15.

A relatively long operating shaft 14 carries a handle 15 and is slidable within sleeve-elements 16 and 17 which are rotatably mounted within the walls 10, 12, and 13, 11 of the frame. Means are provided to prevent relative rotation between the operating shaft 14 and the sleeve element 16 while permitting longitudinal axial movement between them. The intermediate portion of the operating shaft 14 is formed with annular grooves 18 as indicated in Figures 15 and 16, thus constituting an annular rack 19.

Figure 8:
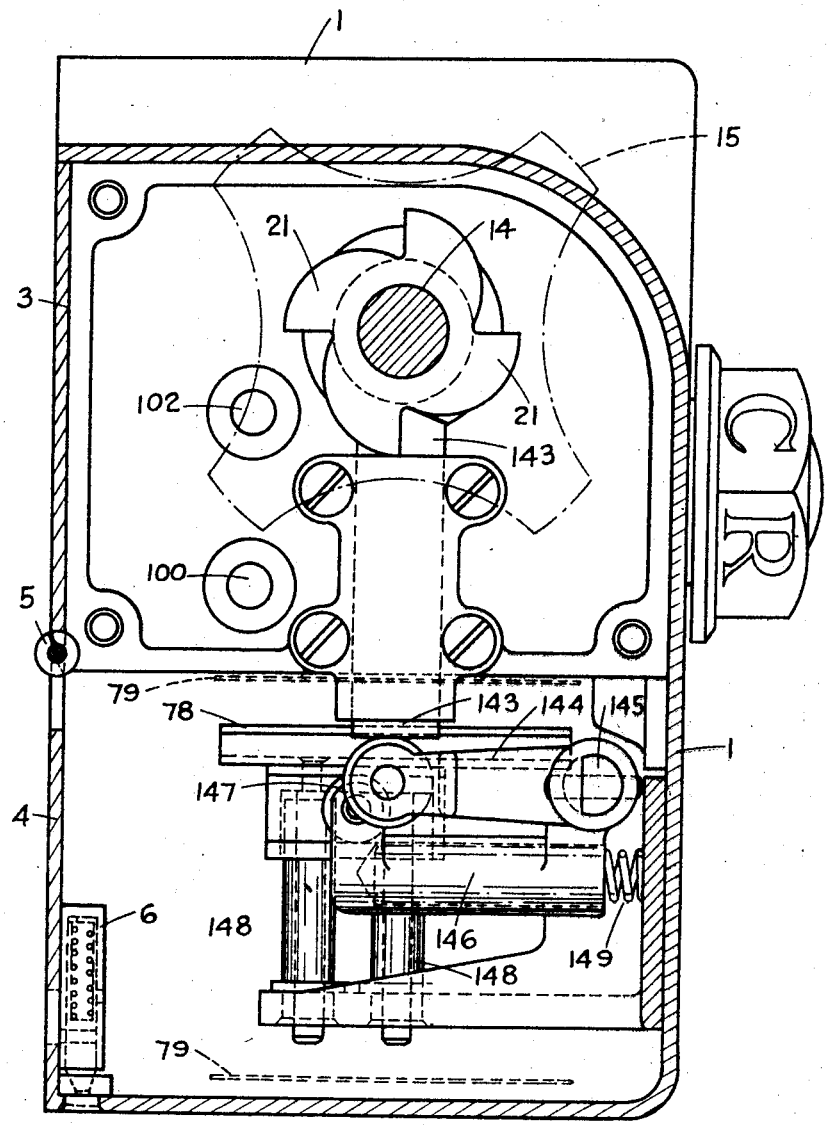
Fig. 8 is a sectional elevation taken on the line 8—8 of Fig. 7.

The sleeve element 16 comprises a sleeve 20 with a set of cam teeth 21 formed at one end as indicated in Figs. 7 and 8. Four cam teeth 21 are shown in the drawings but a different number of cam teeth may be used if desired.

The sleeve 20 is formed with a longitudinal slot 22 with which engages a feather 23 secured to the operating shaft 14 by a screw 24. The sleeve 20 also has secured thereto a collar 25 whose periphery is formed with notches 26 adapted to be engaged by a ball 27 which is spring mounted within a suitable cavity in the frame 7, thereby acting to locate the sleeve element 16 accurately in one or other of a number of positions.

Surrounding the sleeve 20 is another collar 28 formed with a set of cam teeth 29 corresponding in number to the cam teeth 21 but facing the opposite direction (see Figs. 9 and 15). Said collar is formed with an internal tooth 30 engaging in a slot or groove 31 in the sleeve 20.

The sleeve element 17 comprises a sleeve 33 formed with a set of cam teeth 32 most clearly shown in Figs. 14 and 15, and corresponding in number to the cam teeth 21. Rigidly secured to the sleeve 33 is a collar 34 and an internal clutch member 35 provided with claws 36. Such clutch member 35 is adapted to be engaged by a corresponding clutch member 37 secured to the end of the operating shaft 14 and formed with claws 38. It will be seen that the operating shaft 14 is so mounted that it can be slid within the sleeve elements 16 and 17, while when the operating shaft 14 is rotated, the sleeve element 16 will rotate with it while the sleeve element 17 will not in general rotate. When, however, the operating shaft 14 is pressed in as far as it will go, then the claws 38 and 36 of the clutch members 37 and 35 will interengage, and then the sleeve element 17 will be rotated together with the operating shaft 14, the sleeve element 16 being also rotated as before.

A detachable portion 39 (see Figs. 13 and 15) of the frame 7 is formed with a boss 40 which provides a journal bearing for a tube-like extension 41 formed on a disc 42 carrying printing type indicating the class of ticket, such as workmen's, ordinary, child, return, etc.

A nut 43 is secured in the projecting end of the tube like portion 41, while 44 indicates a washer interposed between the nut 43 and the face of the detachable portion 39 of the frame. By rotating the nut 43 by hand the type carrying disc 42 may be rotated. Means (not shown) are provided for locating such disc 42 accurately in one or other of a number of set positions, for instance, a spring pressed ball may be adapted to co-act with circular notches in the side of the said disc 42.

A bolt 45 formed with a head 46 is secured within the tube like extension 41 of the disc 42, and the type-carrying rings 47, 48 and 49 are rotatably mounted on the cylindrical portion of said bolt 45. The printing type may be arranged around the whole periphery of the rings or around a portion thereof. The type-carrying rings 47, 48 and 49 have toothed wheels 50, 51 and 52 respectively secured thereto. In addition to the toothed wheel 52, the type-carrying ring 49 has secured to it another toothed wheel 53, and said wheel 53 gears with the annular rack 19 formed on the operating shaft 14.

The ring 47 carries the printing type indicating the stage of the journey from which the ticket is taken. The stages may be represented by the numbers 1, 2, 3, 4, etc.

The ring 48 carries printing type indicating the date, which may be represented by one of the letters A, B, C, D, etc.

Means (not shown) are provided for accurately locating the rings 47 and 48 in one or other of a number of set positions so that the type carried thereby will be correctly located for printing. Such means may comprise spring pressed levers formed with round noses adapted to engage between the teeth of wheels 50 and 51.

The ring 49 carries printing type indicating the fare such as $1d$, $2d$, $3d$, etc.

The printing type on this ring 49 is shown in the drawings as arranged on a sector instead of the type being arranged on a complete circular disc.

A flanged disc 54 secured to a shaft 55 is formed with a projecting hub 56 which is rotatably mounted within a boss 57 inwardly projecting from the front member 8 of the frame 7. The opposite end of the shaft 55 is rotatably mounted within the hub 58 of another flanged disc 59, which hub 58 is itself rotatably mounted within a detachable portion 60 of the frame.

Secured to the shaft 55 is a toothed wheel 61 which engages with the toothed wheel 51 secured to the type-carrying ring 48. A toothed wheel 62 is secured to the flanged disc 59 and engages with the toothed wheel 50 carried by the type-carrying ring 47.

The periphery of the flanged disc 54 is marked to indicate dates, while the periphery of the flanged disc 59 is marked to indicate the various stages of the journey from which the ticket is taken.

Such markings can be observed through orifices 63 and 64 provided in the top of the outer casing 1. A glass plate is provided under these orifices to keep out dust.

Loosely mounted on the shaft 55 is a sleeve 66 to which is secured a toothed wheel 67 which engages with the toothed wheel 52 carried by the type-carrying ring 49. Secured to the opposite end of the sleeve 66 is a helical gear wheel 68.

A crown wheel 69 is rotatably mounted upon a bolt 70 secured in a cross bar 71 which constitutes part of the frame 7 and extends between the intermediate partitions 12 and 13. An annular plate 72 marked with fare indications is attached to the crown wheel 69, and the teeth 73 of the said crown wheel engage with the toothed wheel 67 hereinbefore referred to. An orifice 74 is provided in the top of the outer casing 1 for reading the fare indications on the annular plate 72.

The ends of the hubs 56 and 58 are slotted at 75 and 76 respectively to allow of their being set by means of a screw-driver or like tool. 77 indicates an orifice through which the ticket blank to be printed (see Fig. 3) is inserted and 78 indicates a printing platen which, on the rotation or part rotation of the operating shaft 14, is raised so as to press the inserted ticket against the type on the disc 42 and rings 47, 48 and 49 (see Fig. 13). An inking ribbon 79 is located between the ticket and the type.

It will be seen that by sliding the operating shaft 14 longitudinally, the rack 19 will turn the toothed wheel 53 and thereby rotate the type carrying ring 49, and such movement will be transmitted through the toothed wheels 52 and 67 to the crown wheel 69 carrying fare indicating plate 72. Such fare indicating plate 72 will show, through the orifice 74, the fare to be marked on the ticket and the corresponding printing type on the ring 49 will be brought into position opposite the printing platen 78. By turning the nut 43 the disc 42 may be set so as to print the desired class of ticket. The faces of the nut are marked to indicate the class of ticket to be printed such as workmans, ordinary, etc. On turning the flanged disc 54 by means of the slots 75 the shaft 55 will be rotated, and such movement will be transmitted through the toothed wheels 61 and 51 to the ring 48 carrying type to indicate the date. The date indication visible through the orifice 63 corresponds to the type on the ring 48 that is brought into printing position. Similarly on turning the flanged disc 59 by means of the slot 76, movement will be transmitted through the toothed wheels 62 and 50 to the ring 47 carrying type indicating the stage of the journey. The stage indication visible through the orifice 64 corresponds to the type on the ring 47 that is brought into printing position.

Printing type 80 varying with each individual ticket issuing machine is provided on a bar 81 extending between the intermediate partitions 12 and 13 of the frame.

A set of counting discs 82 operated by mechanism hereinafter described carry type-members 83 adapted to print numbers. Each time a ticket is printed the number appearing in printing position on the counting disc 82 will be increased by one. The printing platen 78 and the inking ribbon 79 extend underneath the printing type 80 and the type members 83 on the set of counting discs 82 so that, in addition to the class of ticket, the date indication, the stage indication and the fare, the ticket will also be printed with a serial number and with a number or indication characteristic of the particular ticket issuing machine used (see Fig. 5).

The set of counting discs 82 comprises a plurality of type carrying discs 84, 85, 86 etc. (see Fig. 7) each separately rotatably mounted on a common sleeve 87 which is itself rotatably mounted upon an axle 100 which passes through the walls and partitions 10, 12, 14 and 11 of the frame. The set of counting discs 82 are mounted between the intermediate partitions 12 and 13. Other sets of counting discs 88, 89, 90 are mounted in a similar manner between the wall 10 and the partition 12, and further sets of counting discs 91, 92, 93 between the partition 13 and the wall 11.

The sets of counting discs 88, 89, 90, 91, 92, 93 are actuated by mechanism hereinafter described so that they will respectively record the total number of tickets issued at various fares. For instance the set 88 may record the total number of the penny tickets, the set 89 the total number of the two-penny tickets etc.

A yoke member 94 consisting of two levers 95 connected by a strip 97 is mounted upon the sleeve 87 so that such member may oscillate about the axis of the shaft 100.

Similar yoke members 98 and 99 are mounted to embrace the sets of counting discs 88, 89, 90 and 91, 92, 93 respectively and the yoke members 98, 94 and 99 are coupled together by a longitudinal bar 101.

The printing platen 78 and the inking ribbon 79 extend beneath the sets of counting discs 88, 89, 90, 91, 92, 93 and a slot 102 (see Figs. 2, 7 and 13) is provided in the rear side 2 of the casing. Such slot 102 is shown in the drawings as provided in the neighbourhood of the hinges between the upper and lower portions 3 and 4 of the said rear side 2.

In order to take a record of the tickets issued, a record card blank (see Fig. 4) is inserted through the slot 102 and when the printing platen 78 is raised, the totals recorded by the sets of counting wheels 88, 89, 90, 82, 91, 92 and 93 are printed upon the record card together with the number or mark characteristic of the particular ticket issuing machine used (see Fig. 6). The record card shown in Figs. 4 and 6 extends beneath the type carrying disc 42 and the type carrying rings 47, 48, 49 when it is inserted through the slot 102 into its printing position. Preferably means are provided for preventing such disc 42 and rings 47, 48, 49 from printing on to the record card. This may be accomplished by covering up the appropriate portion of the record card by a strip of paper or the like.

Alternatively the mechanism may be so arranged that the portion of the platen 78 extending beneath the disc 42 and rings 47, 48, 49 shall not be raised when a card record is taken. Such construction is not shown in the drawings. Fig. 6 shows a card on which two records of the tickets have been printed at different times.

The numbers and letters indicated in broken lines in Fig. 6 are not printed by the machine, but are inserted by hand afterwards, and are only shown to indicate the use of the card record.

The mechanism operating the sets of counting discs will now be described.

A rod 103 (hereinafter referred to as the selector rod) traverses the end walls 10 and 11 and intermediate partitions 12 and 13 of the frame and is rotatably mounted therein (see particularly Figs. 13, 14 and 15). In Fig. 16 the intermediate portion of this rod 103 is shown as broken away in order not to confuse the drawings.

Secured to said selector rod are three sleeve members 104, 105, and 106. The sleeve member 104 is formed with projecting cam-portions 107, 108, 109 such cam portions having the shape of circular rings with grooves 110, 111 and 112 respectively cut in their peripheries. These grooves 110, 111 and 112 are angularly spaced in different positions around the rotary axis of the rod 103. The sleeve member 106 is formed with cam-portions similar to the sleeve member 104, but with the grooves arranged in different angular positions around the rotary axis of the rod 103.

The sleeve member 105 comprises a cam 113 having the shape of a projecting lug or tooth (see Figs. 13 and 15) and also a helical gear wheel portion 114 which gears with the helical gear wheel 68 hereinbefore referred to.

It will be seen that the longitudinal setting of the operating shaft 14 determines the angular setting of the rod 103, as such members are coupled through the annular rack 19, toothed wheels 53, 52, 67 and helical gear wheels 68 and 114.

A rocking lever 115 is pivotally mounted about a horizontal axle 116 (see Figs. 9 and 16) mounted in the frame and is provided with a projecting nose 117 adapted to engage with the cam teeth 29 on the collar 28 of the sleeve-element 16. A spring 118 continuously tends to depress the lever 115, and said lever 115 is coupled by a connecting rod 119 to the yoke member 98.

When the handle 15 is turned, the operating shaft 14 will rotate the sleeve element 16 the consequent turning movement of the cam teeth 29 will rock the lever 115 which will transmit a rocking movement to the yoke member 98. The other yoke members 94 and 99 will also be rocked in unison with the yoke member 98 on account of their being rigidly coupled therewith through the longitudinal bar 101.

The yoke members 98, 94 and 99 carry driving pawls 120, 121, 122, 123, 124, 125 and 126 (see Fig. 7) pivotally mounted on horizontal axles and respectively adapted to drive the sets of counting wheels 88, 89, 90, 82, 91, 92 and 93. The driving pawls 120, 121 and 122 are each freely pivoted on the horizontal axle 127 itself mounted in the yoke member 98, while the driving pawls 124, 125 and 126 are similarly mounted within the yoke member 99. The driving pawl 123 is freely pivoted upon the horizontal axle 128 mounted in the yoke member 94.

The driving pawl 123 is formed with a plurality of noses 129, 130, 131 etc. each respectively adapted to engage with toothed wheels 132, 133, 134, etc. secured to the discs 84, 85, 86 etc. This driving pawl 123 also comprises a tail 135. A set of retaining pawls diagrammatically indicated by the pawl 136 shown in Fig. 13 is mounted on the frame and arranged to coact with the toothed wheels 132, 133, 134 so that such toothed wheels will only be permitted to rotate in one direction. It will be seen that the retaining pawl 136 is pivoted by means of a pin 137 mounted within lugs or plate portions formed on the bar 81 which extends between the intermediate partitions 12 and 13 of the frame.

A spring 138 continuously presses the retaining pawl 136 into contact with the toothed wheel 132. When the handle 15 is partly rotated (by a quarter of a revolution in the construction shown in the drawings) the yoke 94 will be rocked about the axis of the shaft 100 through the mechanism as hereinbefore explained, and such rocking movement of the yoke 94 will, through the medium of the nose 129 of the pawl 123, in general drive the toothed wheel 132 through one tooth in the counterclockwise direction as viewed in Fig. 13. When however the cam 113 on the selector rod 103 is located in the position shown in Fig. 13, then the tail 135 of the pawl 123 will, during its rocking movement, strike against the cam 113, and this will raise the nose 129 of the pawl so that it will not come into driving relation with the teeth of the wheel 132.

The cam 113 will only be in the position shown in Fig. 13 when the operating shaft 14 is pressed in as far as it will go so as to bring the clutch members 37 and 35 into engagement, and this is only done when a card record is to be printed and not a ticket. In all other positions of the operating shaft 14, the cam 113 on the selector rod 103 will be brought clear of the path of the tail 135 of the pawl 123, and in such case each quarter revolution of the handle 15 will cause the toothed wheel 132 to be rotated through one tooth. The counting disc 84 which is secured to the toothed wheel 132 carries around its periphery type indicating numerals 1, 2, 3 etc.

One of the gaps between the teeth of the wheel 132 is made deeper than the others, such deep gap being indicated by 139 in Fig. 13. When the nose 129 enters such gap 139 this permits the nose to enter deeper than usual, and thereby causes the succeeding nose 130 of the pawl 123 to enter into engagement with a tooth of the succeeding wheel 133, so that the rocking movement of the yoke 94 will then rotate both the wheels 84 and 85 through one tooth.

This permits of carrying from the units to the tens counting disc, as when the units counting disc 84 changes from 9 to 0, the tens counting disc will be rotated one point. In other cases the tens counting disc will not be rotated.

Similarly one of the gaps between the teeth of the wheel 133 is made deeper than the remainder, in order to carry from the tens to the hundreds counting disc.

It will thus be seen that the set of counting discs 82 act to count the total number of tickets issued, the type in printing position on such set of discs corresponding to the serial number of the ticket.

The sets of counting discs 88, 89, 90, 91, 92 and 93 are operated in the same way as the set of counting discs 82, the only difference being that the controlling cams 107, 108, 109, etc. are of different shape to the controlling cam 113.

Thus whereas the cam 113 is so shaped that the set of counting discs 82 will be operated for all longitudinal settings of the operating shaft except one, yet the other cams are so shaped that the set of counting discs corresponding thereto will only be operated for one longitudinal position of the controlling shaft.

This is effected by forming the cams (such as 107, Fig. 9) so that each cam is of circular form with a groove such as 110 cut in its periphery. For one angular setting of the cam 107 a clearance will be provided for the tail of the driving pawl 120 during its rocking movement, so that such pawl will then act to drive the set of counting discs 88, but for all other angular settings the tail of the driving pawl will strike the cam and thereby raise the nose of the pawl out of driving relation with the set of counting discs.

The cams 107, 108, 109, etc. are so arranged that for each longitudinal setting of the operating shaft 14 (except the most inward position) one of the sets of counting discs 88, 89, 90 etc. will be operated. Thus these sets of counting discs may be arranged to count the number of tickets of different value issued, such as 1$d$, 2$d$, 3$d$ fares.

Preferably a device is provided for preventing the rotation of the operating shaft 14 except when it is accurately set longitudinally, corresponding to one or other of the different fares or in the extreme end position for printing a record card.

Such device may comprise a plunger 139 which is spring pressed against the annular rack 19 of the operating shaft (see Figs. 10, 11 and 12). When the operating shaft 14 is accurately set longitudinally in one or other of its different positions, then the nose 140 of the plunger 139 engages in one of the annular grooves 18 and a circular groove 141 in the plunger is brought into a position where it will provide clearance for the passage of a set of claws 142 provided on the end of the sleeve 20 (see Fig. 10). When, however, the operating shaft 14 is not accurately set then the plunger is pressed back against its spring and then interlocks with the claws 140 so as to prevent rotation of the sleeve 20 and therefore of the operating shaft 14 also (see Figs. 11 and 12).

Suitable mechanism for operating the printing platen 78 is diagrammatically indicated in Fig. 8.

Such mechanism comprises a rod 143 mounted so as to be slidable vertically. The lower end of this rod 143 bears on a roller mounted at the end of a lever 144 secured on a horizontal shaft 145 pivotally mounted in the frame of the machine. A second lever 146 is secured to said shaft 145 such lever being arranged in a vertical plane behind the vertical plane of the lever 144 as viewed in Fig. 8, and a roller 147 bears against the bottom of the platen 78, said platen being mounted in bearings 148 secured to the frame so that said platen 78 can slide vertically up and down. A spring 149 bears against the lever 146 and tends to force the platen 78 upwards. It will be seen that the rotation of the operating spindle 14 through a quarter of a revolution will cause one of the cam teeth 21 to depress the rod 143 against the action of the spring 149, thereby also depressing the platen 78. At the end of the quarter revolution of the operating spindle, the cam tooth 21 will be brought clear of the upper end of the rod 143, and then the spring 149 will cause the platen 78 to move sharply upwards. It is understood that impression pads 158 (see Fig. 2) are provided above the surface of the platen 78 as shown in Fig. 8 so that such impression pads will force the inserted ticket into contact with the printing type to effect the printing.

The inking ribbon 79 (see Fig. 8) is preferably formed as a continuous band passing over rollers, the upper stretch being above the platen 78 for printing and the lower stretch being below the platen. Mechanism (not shown) is provided whereby movement is transmitted to the inking ribbon each time the machine is operated.

If desired, the printing platen may be constituted by two separate members, the first member being adapted to print the necessary type for a ticket, and the second member being adapted to print the remaining items which are only necessary for a card record. In such case the first member may be operated as hereinbefore described for the single platen 78, while the second member may be operated from the cam teeth 32 on the sleeve 33 by means of the cam follower 143' and lever mechanism associated therewith similar to that illustrated in Figure 8 of the drawings. This sleeve 33 is only rotated when the handle 15 is pressed in as far as it will go, and therefore the second platen member will only be actuated when a card record is taken.

If desired, another set of counting discs 150 (see Figs. 1 and 14) may be provided and operated through a yoke member and selector shaft in the same way as the set of counting discs 82. Such set of counting discs 150 may be arranged to indicate the serial number of the ticket exactly as the set of counting discs 82 and an observation orifice 151 may be provided so that the serial number of the ticket to be issued can be directly observed therethrough. 152 indicates rings (see Figs. 1 and 2) by which the machine may be suspended by straps on the person of the conductor.

The machine is intended to be operated in the following manner:—

The conductor first sets the date-ring 48 by means of a screw driver or like tool engaging in the slot 75, and he then sets the stage ring 47 at each different stage of the journey by means acting on the screw driver slot 76.

When printing a ticket the nut 43 is set to correspond to the class of ticket—childs—workmans—ordinary, etc., and then the operating shaft is correctly set longitudinally so that the desired fare appears through the orifice 74. Then the ticket is inserted through the slot 77 and the handle 15 turned through a quarter of a revolution, thereby printing the ticket.

In order to take a card record, the handle 15 is pressed in as far as it will go and then the card is inserted through the slot 102 and the handle 15 turned through a quarter of a revolution.

Figs. 17 and 18 indicate a modification of the means for controlling the action of the driving pawls. In this modification instead of the cams acting on the tails 135 of the pawls, they act on springs or strips 153 secured at one end to the yoke members (as 94), the other end of the springs or strips resting on the tails of the pawls. The cams will act on the springs or strips 153 and prevent the pawls 135 from driving the toothed wheels of the counting discs except when such cams are set in the desired position to allow the toothed wheels to be driven.

154, 155, 156 and 157 indicate the positions of the successive noses of the pawl corresponding to the tens, hundreds, thousands, and ten thousands counting discs respectively.

What we claim as our invention and desire to secure by Letters Patent is:—

1. A ticket issuing machine comprising setting means for bringing marking elements into position to correctly mark the ticket to be issued, operating means for effecting the actual marking of the ticket, a plurality of counting units, rocking elements actuated by said operating means, pawls mounted on said rocking elements and arranged to actuate said counting units, and cams adapted to coact with the pawls to prevent certain of them from driving the counting units when the rocking element is moved, the cams being moved from the setting means in order to determine which of the pawls shall be prevented from driving.

2. A ticket issuing machine as claimed in claim 1 in which each counting unit comprises a plurality of wheels, and in which the pawls are formed with a plurality of noses each adapted to act on one of the counting wheels of the counting unit, the pawl being adapted normally to engage with the teeth of the unit counting wheel only, and one of the gaps between such teeth being cut deeper than the remainder so that when the pawl engages in such gap the second nose of the pawl will be brought into engagement with the tens counting wheel or the like to effect carrying.

3. A ticket issuing machine comprising a plurality of counting units, a selector device operatively connected with said units, ticket marking means, a rotatable sleeve element operable to actuate the ticket marking means to effect the actual marking of the ticket and to operate a selected counting unit, an operating shaft slidably mounted in said sleeve for rotation therewith, a rack portion on said shaft, toothed wheels connecting said rack portion with said marking means to position the latter for correctly marking the ticket to be issued, and to set the selector device to insure operation of a selected one of said counting units.

4. In a ticket issuing machine, the combination with a plurality of ticket marking means, of mechanism for selecting the desired marking means and effecting the marking of a ticket thereby, and an operating member axially shiftable to actuate said mechanism for selecting the marking means and rotatable to actuate said mechanism for effecting the actual marking.

5. In a ticket issuing machine, the combination with a plurality of ticket marking means, of mechanism for selecting the desired marking means and effecting the marking of a ticket thereby, an operating member axially shiftable to actuate said mechanism for selecting the marking means and rotatable to actuate said mechanism for effecting the actual marking, and means actuated by the rotation of said member for recording a serial number on each ticket.

6. In a ticket issuing machine, the combination with means for marking the value thereof on each ticket issued, of means for recording the total number of tickets issued, an operating shaft axially shiftable to select the value marked and rotatable to actuate said first mentioned means to effect the actual marking, said shaft being shiftable to a position in which no value is selected, rotation of the shaft in the last mentioned position serving to operate said second mentioned means to record the total number of tickets.

7. In a ticket issuing machine, the combination with a rotatable operating shaft, of marking means selectively brought into operative position by longitudinal movement of said shaft for indicating the value of the ticket issued, marking means for indicating the total number of tickets issued, and impression means operated by rotation of said shaft for contacting the ticket with either of said marking means.

8. In a ticket issuing machine, the combination with a rotatable operating shaft, of marking means selectively brought into operative position by longitudinal movement of said shaft for indicating the value of the ticket issued, marking means for indicating the total number of tickets issued, and separate impression means operable to contact the ticket with either of said marking means, the selection of the impression means operated depending upon the longitudinal position of the shaft.

9. In a ticket issuing machine, the combination with a rotatable operating shaft, of marking means selectively brought into operative position by longitudinal movement of said shaft for indicating the value of the ticket issued, marking means for indicating the total number of tickets issued, an impression means operable by rotation of the shaft in longitudinal positions thereof corresponding to a selected ticket value for contacting the ticket with said first mentioned marking means, and a second impression means operable by rotation of the shaft in a longitudinal position thereof corresponding to no selected ticket value for contacting the ticket with said second-mentioned marking means.

10. In a ticket issuing machine, the combination with a plurality of ticket marking means, of mechanism for selecting the desired marking means and effecting the marking of a ticket thereby, an operating member axially shiftable to actuate said mechanism for selecting the marking means and rotatable to actuate said mechanism for effecting the actual marking, and means for preventing rotation of said member when the latter occupies positions intermediate the selective positions for the marking means.

11. A ticket issuing machine comprising ticket marking elements, a longitudinally and angularly movable operating shaft, one of such movements acting to bring the marking elements into position to correctly mark the ticket to be issued, and the other movement acting to effect the actual marking of the ticket, a plurality of counting units to count separately the number of tickets of different values issued, the counting unit operated being dependent on the first movement or setting of the operating shaft that correctly positions the marking elements, and impression pads operated by the rotation of the operating shaft.

12. A ticket issuing machine comprising ticket marking elements, a longitudinally and angularly movable operating shaft, one of such movements acting to bring the marking elements into position to correctly mark the ticket to be issued, and the other movement acting to effect the actual marking of the ticket, a plurality of counting units to count separately the number of tickets of different values issued, the counting unit operated being dependent on the first movement or setting of the operating shaft that correctly positions the marking elements, an impression pad for printing the serial number of the ticket and the other marking required, and a second set of impression pads to print the totals recorded by the counting units, said second set of impression pads being only operated when the marking elements are set so as not to impress an indication of fare (or to impress zero-fare) on any ticket that may be inserted in the machine.

13. A ticket issuing machine comprising ticket marking elements, a longitudinally and angularly movable operating shaft, one of such movements acting to bring the marking elements into position to correctly mark the ticket to be issued, and the other movement acting to effect the actual marking of the ticket, a plurality of counting units to count separately the number of tickets of different values issued, the counting unit operated being dependent on the first movement or setting of the operating shaft that correctly positions the marking elements, and means for preventing the movement of the operating shaft to effect the actual marking of the ticket unless the other movement of the shaft has been accurately effected to bring said shaft into one or other of a number of set positions.

In testimony whereof we hereunto affix our signatures.

ERNEST CLAYTON TILLY.
HENRY MATTINSON.